United States Patent
Machani et al.

(10) Patent No.: US 11,032,261 B2
(45) Date of Patent: Jun. 8, 2021

(54) ACCOUNT RECOVERY USING IDENTITY ASSURANCE SCORING SYSTEM

(71) Applicant: RSA Security, Bedford, MA (US)

(72) Inventors: Salah E. Machani, Medford, MA (US); Kevin Bowers, Medford, MA (US)

(73) Assignee: RSA Security LLC, Bedford, MA (US)

( * ) Notice: Subject to any disclaimer, the term of this patent is extended or adjusted under 35 U.S.C. 154(b) by 267 days.

(21) Appl. No.: 16/263,276

(22) Filed: Jan. 31, 2019

(65) Prior Publication Data
US 2020/0252381 A1    Aug. 6, 2020

(51) Int. Cl.
G06F 21/00 (2013.01)
H04L 29/06 (2006.01)
H04L 9/32 (2006.01)
G06F 21/41 (2013.01)

(52) U.S. Cl.
CPC ............. H04L 63/08 (2013.01); G06F 21/41 (2013.01); H04L 9/321 (2013.01)

(58) Field of Classification Search
CPC .......... G06F 21/30; G06F 21/36; G06F 21/31; G06F 21/42; G06F 21/45; G06F 21/46; H04L 9/32; H04L 9/321; H04L 9/3226
See application file for complete search history.

(56) References Cited

U.S. PATENT DOCUMENTS

| | | |
|---|---|---|
| 2008/0127296 A1 | 5/2008 | Carroll et al. |
| 2010/0293600 A1 | 11/2010 | Schechter et al. |
| 2016/0092671 A1* | 3/2016 | Andreeva ............... G06F 21/46 726/6 |

OTHER PUBLICATIONS http://www.sestek.com/2015/11/a-security-question-for-organizations-passive-or-active-voice-authentication/, downloaded on Jan. 9, 2019.
Ping Identity, Authentication Authority, Connect Any User with Any Application, https://www.pingidentity.com/en/platform/authentication-authority.html, downloaded Jan. 11, 2019.
NIST, Special Publication 800-63, www.nist.gov/itl/tig/projects/special-publication-800-63, May 2, 2016.

* cited by examiner

*Primary Examiner* — Edward Zee
(74) *Attorney, Agent, or Firm* — Danielson Legal LLC

(57) ABSTRACT

Techniques are provided for account recovery using an identity assurance scoring system. One method comprises providing multiple available identity assurance techniques, each assigned a corresponding identity assurance value indicating a level of assurance for the corresponding available identity assurance technique; in response to a user request to obtain access to a protected resource following a loss incident of a user authenticator: receiving, from the user, authentication information associated with the available identity assurance techniques; aggregating the corresponding assigned identity assurance values for the received available identity assurance techniques to determine an aggregate identity assurance value; determining if the aggregate identity assurance value satisfies a predefined identity assurance level criteria; and evaluating the user request to access the protected resource based on the determining. The corresponding assigned identity assurance value of a given available identity assurance technique is optionally modified based on the available identity assurance techniques that have already been performed.

17 Claims, 6 Drawing Sheets

↙ 200

| Available Identity Assurance Techniques 120 | Assigned Identity Assurance Values 130 |
|---|---|
| Device Ownership (e.g., AAL1 through AAL3 authenticators) | Varies by Authenticator Type (e.g., 0 or 5, 0 or 8, and 0 or 13, respectively) |
| Dynamic Knowledge-Based Authentication | 0 to 2 |
| Phone Number Ownership Verification | 0 or 2 |
| Biometrics | 0 to 5 |
| Behaviormetrics | 0 to 3 |
| Government Issued Documents | 0 to 8 |
| Trusted Referee | 0 to 8 |
| Social Media Graph | 0 to 8 |
| Social Media Logon | 0 to 8 |
| Federated Identity | 0 to 8 |

| Available Identity Assurance Techniques 120 | Assigned Identity Assurance Values 130 |
|---|---|
| Device Ownership (e.g., AAL1 through AAL3 authenticators) | Varies by Authenticator Type (e.g., 0 or 5, 0 or 8, and 0 or 13, respectively) |
| Dynamic Knowledge-Based Authentication | 0 to 2 |
| Phone Number Ownership Verification | 0 or 2 |
| Biometrics | 0 to 5 |
| Behaviormetrics | 0 to 3 |
| Government Issued Documents | 0 to 8 |
| Trusted Referee | 0 to 8 |
| Social Media Graph | 0 to 8 |
| Social Media Logon | 0 to 8 |
| Federated Identity | 0 to 8 |

FIG. 2

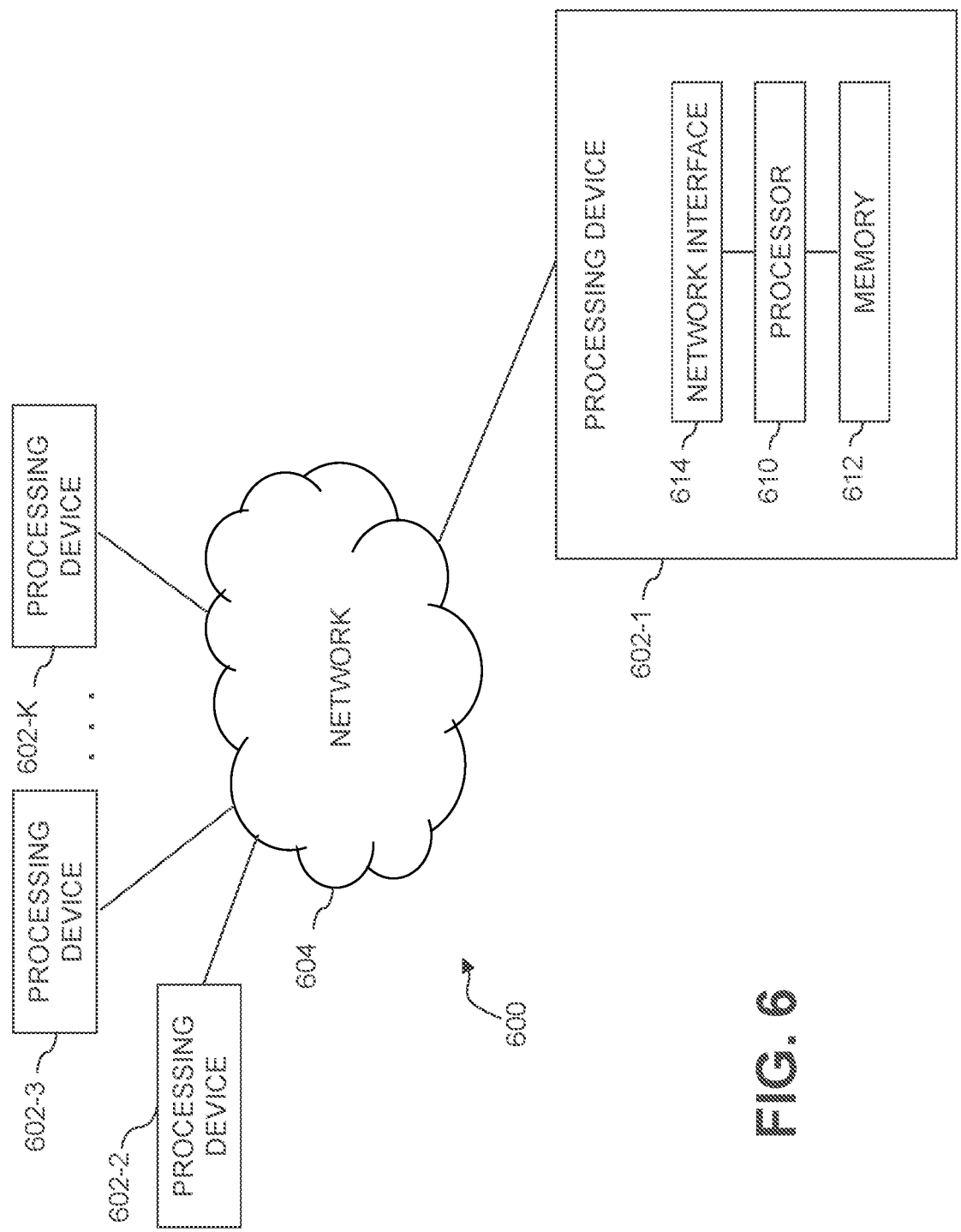

ACCOUNT RECOVERY USING IDENTITY ASSURANCE SCORING SYSTEM

FIELD

The field relates generally to account recovery techniques.

BACKGROUND

A significant percentage of user requests that are sent to an Information Technology (IT) service team are to reset user passwords. Meanwhile, the average labor cost for a single password reset is estimated at $70 per request. Thus, self-service password reset solutions can significantly reduce the costs of an IT service team. Existing solutions, however, rely on relatively weak authentication methods, such as knowledge-based authentication (KBA); email links; and Short Message Service (SMS) one-time codes. Such methods do not meet a Level 1 authentication assurance, as specified in NIST-800-63. Thus, such methods are not adequate for restoring access to accounts that are protected using Level 2 or Level 3 Assurance Authenticators, such as multi-factor cryptographic authenticators.

A need therefore exists for improved identity assurance techniques that provide a higher assurance level regarding the identity of a claimant before allowing the claimant to access a protected resource, such as an account, or to bind a new authenticator to the account of claimant after loss, damage, replacement or compromise of an old authenticator.

SUMMARY

In one embodiment, a method comprises providing a plurality of available identity assurance techniques, wherein the available identity assurance techniques are assigned a corresponding identity assurance value indicating a level of assurance assigned to the corresponding available identity assurance technique; performing the following steps, in response to a user request to obtain access to a protected resource following a loss incident of a user authenticator: receiving, from the user, authentication information associated with one or more of the available identity assurance techniques; aggregating the corresponding assigned identity assurance values for each of the received available identity assurance techniques to determine an aggregate identity assurance value; determining if the aggregate identity assurance value satisfies a predefined identity assurance level criteria; and evaluating the user request to access the protected resource based on the determining.

In some embodiments, the corresponding assigned identity assurance value of a given available identity assurance technique is modified based on the available identity assurance techniques that have already been performed. In one or more embodiments, the user selects one or more available identity assurance techniques to perform user identity proofing and/or user authentication until the user satisfies the predefined identity assurance level criteria. The predefined identity assurance level criteria is optionally based on an identity assurance value assigned to the user authenticator associated with the loss incident. The user optionally enrolls a selection of the available identity assurance techniques to be used for recovery after satisfying a specified enrollment authentication assurance level.

Other illustrative embodiments include, without limitation, apparatus, systems, methods and computer program products comprising processor-readable storage media.

BRIEF DESCRIPTION OF THE DRAWINGS

FIG. 2 is a sample table illustrating an exemplary set of available identity assurance techniques and the corresponding exemplary assigned identity assurance values of FIG. 1, in further detail, according to one or more embodiments;

FIG. 6 illustrates another exemplary processing platform that may be used to implement at least a portion of one or more embodiments of the disclosure.

DETAILED DESCRIPTION

Figure 1:
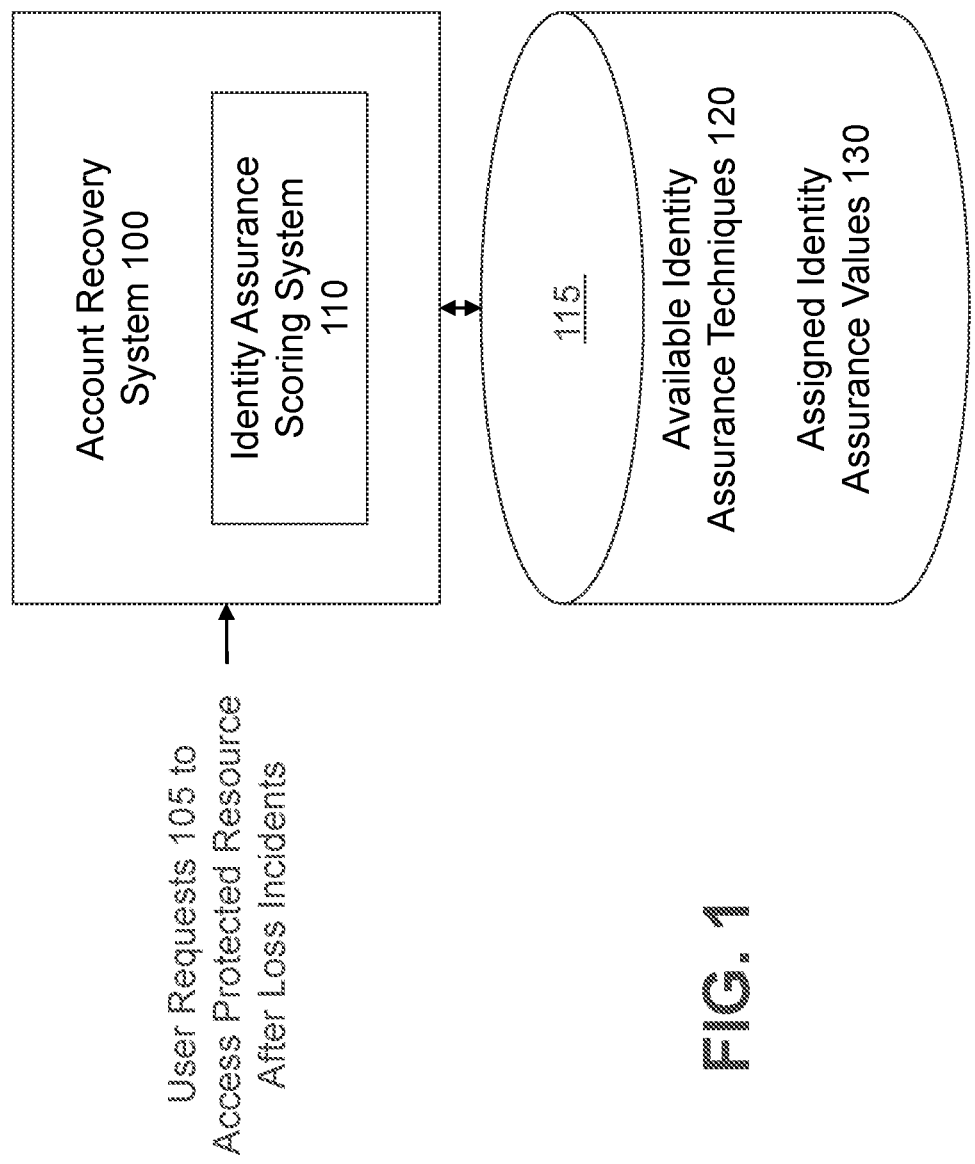
FIG. 1 illustrates an account recovery system, according to an embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for account recovery using an identity assurance scoring system.

As noted above, one or more embodiments of the disclosure provide improved identity assurance techniques that provide a higher assurance level about the identity of a claimant. In some embodiments, the disclosed identity assurance techniques determine an identity assurance score that uses multiple weighted user-selected identity verification and/or identity evidence validation techniques, each contributing to an overall identity assurance score. Once the overall identity assurance score of the user reaches a predefined threshold, for example, that is set by a security officer or an administrator, the user can obtain a recovery code or an emergency access code. The administrator of the recovery service or the user decides which steps to go through in order to reach the minimum specified threshold.

Modern user authentication solutions often employ device-side authenticators that provide secure and convenient user authentication. Such solutions aim at replacing passwords as the only or as the primary means of user verification. Examples of such authenticators include out-of-band (OOB) authenticators (e.g., SMS One-Time Passcode (OTP), and/or mobile push notifications); single factor tokens (e.g., RSA PINless SecurID® token from Dell EMC of Hopkinton, Mass.); multi-factor tokens (e.g., RSA PIN-full SecurID® token from Dell EMC of Hopkinton, Mass.; and/or RSA PIN/Biometric Protected Mobile Authenticate application from Dell EMC of Hopkinton, Mass.); single-factor cryptographic devices (e.g., FIDO U2F (Universal Second Factor) from the FIDO Alliance; PINless Smartcards; and/or Soft Certificates); and/or multi-factor cryptographic devices (e.g., FIDO2 Authenticators from the FIDO Alliance; and/or PIN Smartcards). The authenticators offer a higher authentication assurance level when used in combination with memorable secrets, such as a password (e.g., password plus OOB SMS, password plus "tap and go" FIDO authenticators) or alone (e.g., PIN protected smartcards; and/or biometric enabled FIDO authenticators). The FIDO standard, discussed further below, establishes a set of specifications for developing and implementing such authenticators.

In one or more embodiments, the present disclosure provides improved techniques for account recovery using an identity assurance scoring system. In this manner, users can combine multiple authentication and identity proofing methods to overcome the loss of a primary authentication device. The disclosed techniques can be used, for example, for emergency access and/or account recovery and recreation of a primary authentication device. The exemplary system is adaptive, giving users a choice in how they provide the necessary identity assurance, yet strict in requiring that the combined identity assurance meets or exceeds a specified assurance level requirement for the application and/or protected resource in question. Such a system can provide a self-service capability to users who have lost their primary authentication device, reducing the burden on the IT staff and lowering costs for the organization.

FIG. 1 illustrates an account recovery system 100, according to an embodiment of the disclosure. As shown in FIG. 1, the exemplary account recovery system 100 processes user requests 105 to access a protected resource (e.g., an account) after a loss incident. In this manner, if the authenticator of a user is lost, stolen, damaged, replaced and/or compromised (collectively referred to herein as a "loss incident"), the user would need to reassert their identity (often referred to as an "identity assertion") to regain access to the account or another protected resource. If the loss is temporary (e.g., a forgotten device), there may also be an emergency access procedure that can temporarily grant the user access without revoking a previous authenticator of the user and forcing an account recovery process.

The exemplary account recovery system 100 comprises an identity assurance scoring system 110, as discussed further below in conjunction with FIG. 3. The exemplary account recovery system 100 accesses a data store 115 comprising, for example, one or more available identity assurance techniques 120 to allow a user to reassert their identity, and a corresponding assigned identity assurance value 130 assigned to each of the available identity assurance techniques 120, as discussed further below in conjunction with FIG. 2.

FIG. 2 is a sample table 200 illustrating an exemplary set of available identity assurance techniques 120 and the corresponding exemplary assigned identity assurance values 130 of FIG. 1, in further detail, according to one or more embodiments. Generally, a user must establish their identity with an acceptable assurance level, whether for temporary access or for replacement of an authenticator. Without access to a primary authenticator device, for example, the user must instead provide a combination of multiple, possibly weaker, authenticators, to achieve a comparable identity assurance. This can include other authentication factors, but also documentation that is regularly used for identity proofing (e.g., a driver's license). FIG. 2 illustrates some representative means by which such identity assurance (e.g., using various combinations of authenticators, user identity verification techniques and identity evidence validation techniques).

In one or more embodiments, to overcome the assurance provided by the unavailable primary authenticator device, the user leverages a combination of other authenticators and identity proofing methods, such as those identified in FIG. 2, to meet or exceed the assurance level necessary for the account, application or other protected resource being accessed.

For example, a user could select a phone number ownership option (0-2 points) and government issued documents option (0-8 points) to collect at least eight points, which is an exemplary specified minimum number of points to recover for a given AAL2 authenticator, for example, such as a Software Token mobile device (e.g., the user will be able to obtain up to 10 points, while only eight point are needed).

In some embodiments of the disclosure, each authenticator and other available identity assurance techniques 120 (e.g., identity proofing methods) is assigned a weight or a score, referred to herein as the assigned identity assurance values 130. In the example of FIG. 2, the weighting/scoring system assigns points to each of the available identity assurance techniques 120, depending on their level of assurance (e.g., following a Fibonacci numbering system). Other scoring systems can be used, as would be apparent to a person of ordinary skill in the art. The goal is to require users to achieve the minimum identity assurance threshold required to regain access to an account after loss or damage of one of an Authenticator Assurance Level 1 (AAL1), AAL2 or AAL3 authenticators, with assigned weights of 0 or 5, 0 or 8, and 0 or 13, respectively (based on the NIST-800-63 classification of authenticator types).

In order to regain access to an account, application or another protected resource after a loss incident of a user authenticator, the user must select one or more of the available identity assurance techniques 120 and then go through multiple identity proofing or user authentication steps with the goal to achieve the minimum required identity proof score to replace the lost authenticator.

For example, if an AAL2 authenticator is enrolled using an Identity Assurance Level 2 (IAL2) authenticator having an assigned identity assurance value 130 of 8, and the AAL2 authenticator is lost or damaged, the user must use an equivalent or higher AAL authenticator to regain access to the account (e.g., AAL 2 or AAL3 authenticators) or obtain an aggregate identity assurance value of at least 8 points and register a new AAL2 authenticator, using various possible combinations of the available identity assurance techniques 120 identified in FIG. 2.

Note that some methods are binary (either pass or fail, such as the an AAL1, AAL2 or AAL3 authenticators referenced above) and the user is awarded either the full value points or no points, respectively, depending on whether the user has possession of the given authenticator. Other available identity assurance techniques 120 exist on a continuum and may award partial points to the user (e.g., a biometric match is a probability which can be leveraged directly instead of checking it against a threshold). A failure to pass a given authentication method which was chosen by the user may also result in negative points, as a failed authentication may make the user more suspect.

Thus, as discussed further below in conjunction with FIG. 3, in some embodiments, the exemplary recovery process 300 is iterative. The user selects a given available identity assurance technique 120 (e.g., an identity proofing method or an authentication mechanism) which the user feels he or she can provide, and then, based on the result of that validation, the user may be closer to their authentication goal by some number of points. The user can then go back to the list of available identity assurance techniques 120 to choose another one. There may be policies in place that certain authentication methods overlap substantially, so only one technique from the set of overlapping available identity assurance techniques 120 may be chosen. For example, a biometric captured by a phone is tightly coupled to the phone. Thus, if the user first proves ownership of a phone number, and then chooses to perform a biometric capture from that device, the biometric may not be worth the full value as part of that score was captured in the device ownership test. These overlaps are complicated but need to be understood and accounted for in the scoring system.

As discussed further below in conjunction with FIG. 4, a user can select one or more of the available identity assurance techniques 120 during an enrollment phase, to be subsequently used for recovery (e.g., after satisfying a predefined enrollment authentication assurance level). Thereafter, during a recovery, the user can optionally be automatically presented with the available identity assurance techniques 120 that were previously selected during enrollment.

Figure 3:
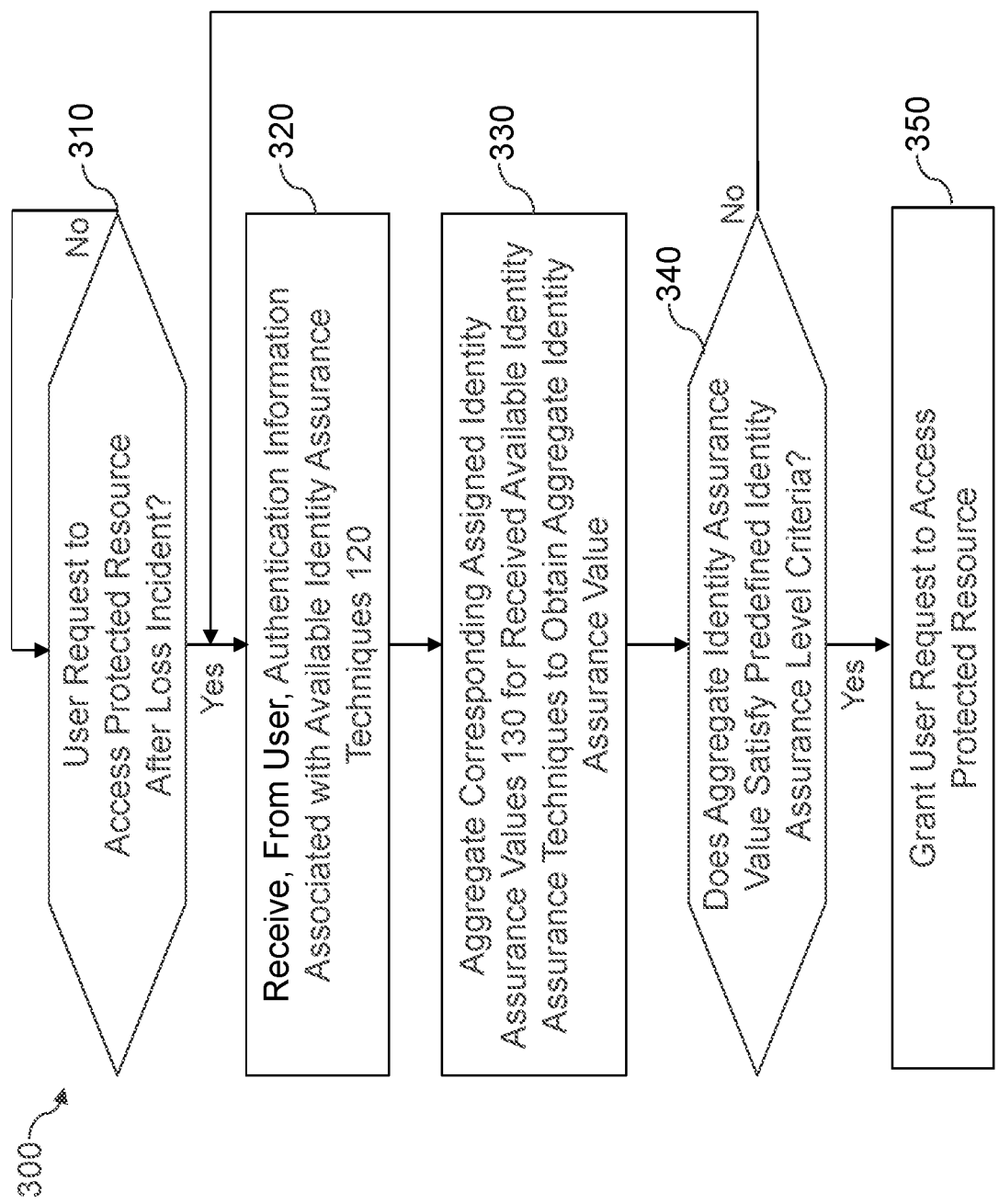
FIG. 3 is a flow chart illustrating an exemplary implementation of a recovery process that uses an identity assurance scoring system, according to some embodiments of the disclosure.

FIG. 3 is a flow chart illustrating an exemplary implementation of a recovery process 300 that uses an identity assurance scoring system, according to some embodiments of the disclosure. As shown in FIG. 3, a test is performed during step 310 to determine if a user request is received to access a protected resource after a loss incident. Once it is determined during step 310 that a user request has been received to access a protected resource after a loss incident, authentication information is received from the user during step 320, associated with one or more available identity assurance techniques 120.

During step 330, the exemplary recovery process 300 aggregates the corresponding assigned identity assurance values 130 for the received available identity assurance techniques to obtain an aggregate identity assurance value. A test is performed during step 340 to determine if the aggregate identity assurance value satisfies a predefined identity assurance level criteria. If it is determined during step 340 that the aggregate identity assurance value does not satisfy the predefined identity assurance level criteria, then program control returns to step 320 to obtain and evaluate additional authentication information associated with additional available identity assurance techniques.

Once it is determined during step 340 that the aggregate identity assurance value satisfies the predefined identity assurance level criteria, then the user request to access the protected resource is granted during step 350. In some embodiments, depending on the final confidence score, the recovery mechanism may provide a recovery code (e.g., a QR code) to the user during step 350 to facilitate the access. If a code is generated, the user opens an authenticate application and scans the provided QR code to register the new device, or otherwise access the protected resource.

Figure 4:
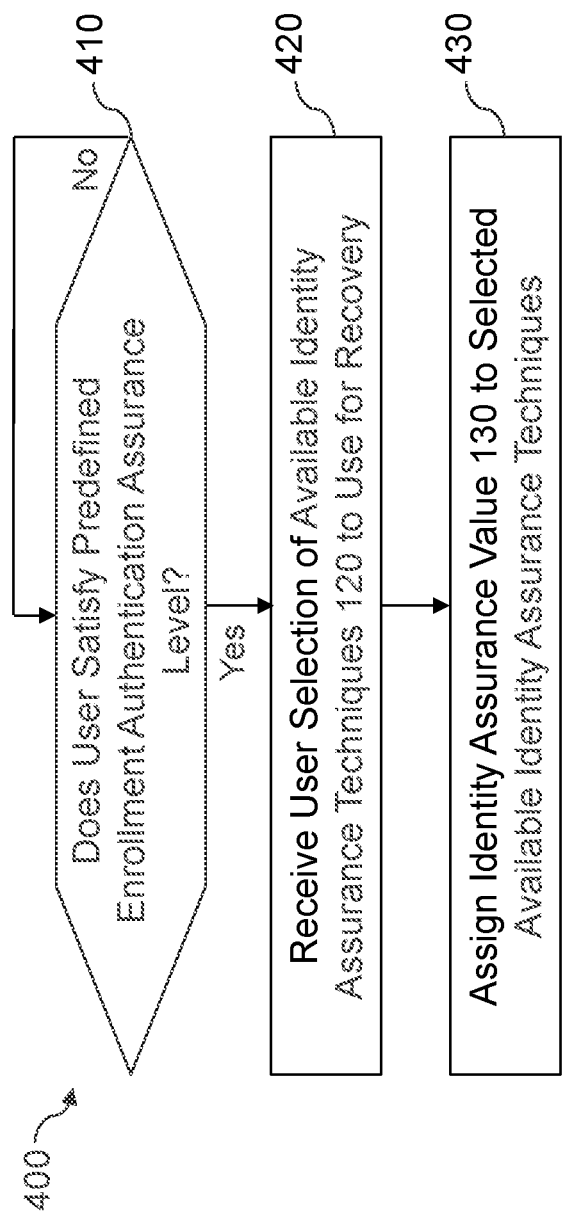
FIG. 4 is a flow chart illustrating an exemplary implementation of an enrollment process that allows a user to select available identity assurance techniques 120 to be used for recovery, according to one or more embodiments of the disclosure.

In some embodiments, when needed for recovery, the user will be presented with a list of the available identity assurance techniques 120, for example, that were enrolled using the enrollment process 400 of FIG. 4, the assigned identity assurance values 130 for each of the presented available identity assurance techniques 120, and a target point total needed to access the application or another protected resource in question. The user can obtain temporary access to the application, for example, or the user can obtain access to an account recovery application that allows for the enrolment of a new authenticator.

Upon selecting one of the available identity assurance techniques 120, the user is prompted to complete that process. If successful, the user would be awarded the corresponding number of points. If the awarded points are sufficient to gain access, the user would then be given access to the application, for example. If more points are required, the user would be returned to the list of available identity assurance techniques 120 that have not yet been attempted (possibly modified based on the first choice) and asked to choose another method to continue acquiring points. Once enough points are acquired, the user is given the requested access.

In some embodiments, the corresponding assigned identity assurance value of a given available identity assurance technique can be modified based on the available identity assurance techniques that have already been performed. As noted above, there is a natural overlap between some techniques. For example, if the user performs identity proofing with a government issued identification (e.g., a driver's license), then if the user proves knowledge of some piece of information on the license (a birthdate, for example) additional valuable information is not provided. However, knowledge of the birthdate without the license could provide valuable identity assurance when combined with other information.

FIG. 4 is a flow chart illustrating an exemplary implementation of an enrollment process 400 that allows a user to select available identity assurance techniques 120 to be used for recovery, according to one or more embodiments of the disclosure. As shown in FIG. 4, a test is performed during step 410 to determine if the user has satisfied a predefined enrollment authentication assurance level. After it is determined during step 420 that the user has satisfied the predefined enrollment authentication assurance level, a user selection of the available identity assurance techniques 120 to use for recovery is received during step 420. Thereafter, the assigned identity assurance values 130 for each of the selected available identity assurance techniques 120 is determined during step 430.

In some embodiments, the user enrolls to use the recovery service described herein. During the enrollment phase, the user must use active authenticators to satisfy the predefined enrollment authentication assurance level evaluated during step 410 (e.g., providing the highest authentication assurance level in the recovery system). For example, for a NIST AAL2 Relying Party, the user must use AAL2 authenticators (or higher) to enroll in the recovery service. The user can choose to enroll any number of recovery methods (e.g., "opt in" for such enrolled recovery methods) and the system will decide how many points each one is worth toward recovery.

In various embodiments, a user interface can allow a user to specify the nature of the loss incident and the user can optionally be guided through appropriate recovery mechanisms. For example, a user interface can allow a user to select a "new phone to be registered" option" or a "lost phone" option.

In the case of a new phone to be registered, for example, a backend service can optionally evaluate whether the phone number of the new device is the same phone number of the previously registered device. If the phone number is the same, a confidence score can be increased, for example, by up to 10%.

In the case of a lost phone, some embodiments assume that the user does not have other registered factors of the same authentication assurance level in order to authenticate, and/or the user wants to deregister and replace a lost phone. A recovery mechanism can send the user a text message with a link on their new phone, and the user can select the link to open, for example, a web-based application or a pre-installed authentication application. A backend service can determine that the presented phone number is a valid number and that the user 'owns' the number (e.g., the confidence score can be increased, for example, by up to 10%.

In one or more embodiments, the user can present evidence to the recovery mechanism for their identity claim. For example, the user can use a camera on the new device and be prompted to scan the front and back of an identification card (e.g., a Driving License). The integrity of the identification card can then be verified, using known verification techniques. In one variation, the users can also be prompted to take photograph of themselves, optionally with liveness detection, and the recovery mechanism can verify that the selfie matches the picture on the identification card.

In some embodiments, the disclosed techniques for account recovery using an identity assurance scoring system provide a convenient, flexible and secure mechanism for a user to regain access to an account or another protected resource following a loss incident of an authenticator.

Among other benefits, the disclosed account recovery techniques consider a combination of multiple available identity assurance techniques 120 presented by a user and evaluate the corresponding assigned identity assurance values 130 for each of the presented available identity assurance techniques 120, until a specified identity assurance level criteria is satisfied.

One or more embodiments of the disclosure provide improved methods, apparatus and computer program products for account recovery using an identity assurance scoring system. The foregoing applications and associated embodiments should be considered as illustrative only, and numerous other embodiments can be configured using the techniques disclosed herein, in a wide variety of different applications.

It should also be understood that the disclosed account recovery techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for account recovery using an identity assurance scoring system may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based account recovery engine 100, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based account recovery platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
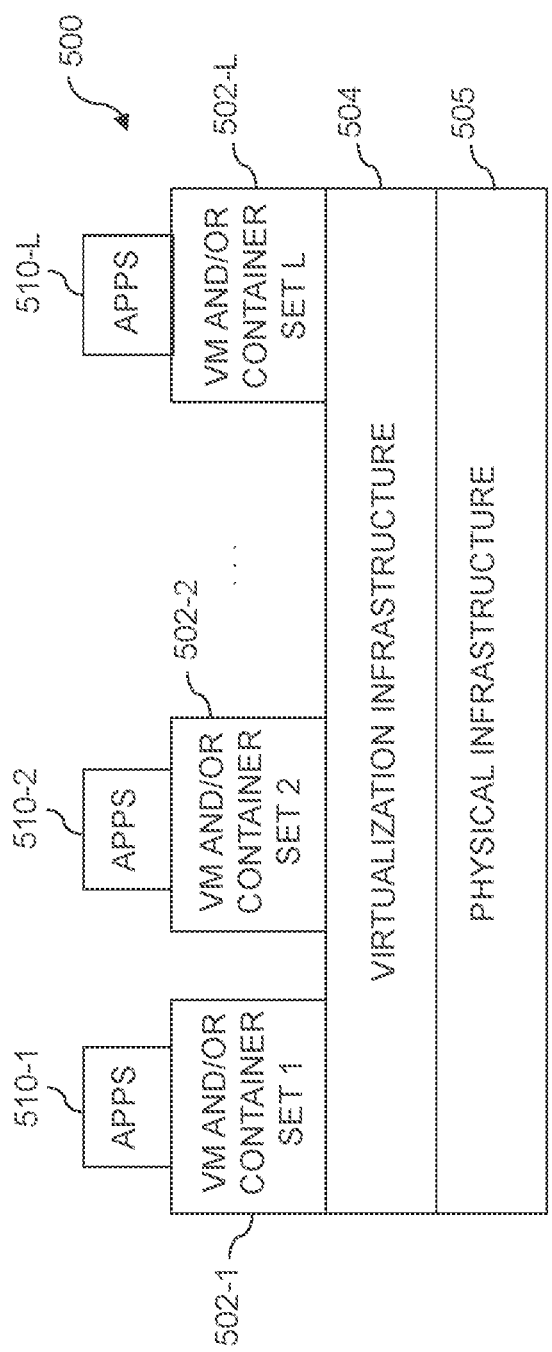
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of the account recovery system 100. The cloud infrastructure 500 comprises multiple virtual machines (VMs) and/or container sets 502-1, 502-2, ... 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, ... 510-L running on respective ones of the VMs/container sets 502-1, 502-2, ... 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide account recovery functionality of the type described above for one or more processes running on a given one of the VMs. For example, each of the VMs can implement account recovery control logic and identity assurance scoring for providing account recovery functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide account recovery functionality of the type described above for one or more processes running on different ones of the containers. For example, a container host device supporting multiple containers of one or more container sets can implement one or more instances of account recovery control logic and associated identity assurance scoring for providing account recovery functionality.

As is apparent from the above, one or more of the processing modules or other components of account recovery system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, ... 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

providing a plurality of available identity assurance techniques, wherein the plurality of available identity assurance techniques are assigned respective identity assurance values each indicating a level of assurance for the corresponding available identity assurance technique;

performing the following steps, using at least one processing device, in response to a user request to obtain access to a protected resource following a loss incident of a user authenticator:

receiving, from the user, authentication information associated with at least two selected identity assurance techniques of the plurality of available identity assurance techniques;

determining whether there is an overlap between the received authentication information associated with the at least two selected identity assurance techniques;

modifying the identity assurance value associated with at least one of the selected identity assurance techniques upon determining there is an overlap between the received authentication information;

aggregating the corresponding assigned identity assurance values for each of the at least two selected identity assurance techniques to determine an aggregate identity assurance value;

determining whether the aggregate identity assurance value satisfies a predefined identity assurance level criteria; and evaluating the user request to access the protected resource based on the determination of whether the aggregate identity assurance value satisfies a predefined identity assurance level criteria.

2. The method of claim 1, wherein the plurality of available identity assurance techniques comprises one or more of at least one user authenticator technique, at least one user identity verification technique and at least one identity evidence validation technique.

3. The method of claim 1, wherein the loss incident comprises one or more of loss, theft, damage, replacement and compromise of the user authenticator.

4. The method of claim 1, wherein the corresponding assigned identity assurance value comprises one or more of a corresponding weight and a corresponding score.

5. The method of claim 1, wherein the receiving step further comprises the user selecting one or more available identity assurance techniques to perform one or more of user identity proofing and user authentication until the user satisfies the predefined identity assurance level criteria.

6. The method of claim 1, wherein the receiving, aggregating and determining steps are performed iteratively until the user satisfies the predefined identity assurance level criteria.

7. The method of claim 1, wherein the predefined identity assurance level criteria is based on an identity assurance value assigned to the user authenticator associated with the loss incident.

8. The method of claim 1, wherein the user enrolls a selection of the plurality of available identity assurance techniques to be used for recovery after satisfying a specified enrollment authentication assurance level.

9. A system, comprising:

a memory; and at least one processing device, coupled to the memory, operative to implement the following steps:

providing a plurality of available identity assurance techniques, wherein the plurality of available identity assurance techniques are assigned respective identity assurance values each indicating a level of assurance for the corresponding available identity assurance technique;

performing the following steps, in response to a user request to obtain access to a protected resource following a loss incident of a user authenticator:

receiving, from the user, authentication information associated with at least two selected identity assurance techniques of the plurality of available identity assurance techniques;

determining whether there is an overlap between the received authentication information associated with the at least two selected identity assurance techniques;

modifying the identity assurance value associated with at least one of the selected identity assurance techniques upon determining there is an overlap between the received authentication information;

aggregating the corresponding assigned identity assurance values for each of the at least two selected identity assurance techniques to determine an aggregate identity assurance value;

determining whether the aggregate identity assurance value satisfies a predefined identity assurance level criteria; and evaluating the user request to access the protected resource based on the determination of whether the aggregate identity assurance value satisfies a predefined identity assurance level criteria.

10. The system of claim 9, wherein the receiving step further comprises the user selecting one or more plurality of the available identity assurance techniques to perform one or more of user identity proofing and user authentication until the user satisfies the predefined identity assurance level criteria.

11. The system of claim 9, wherein the receiving, aggregating and determining steps are performed iteratively until the user satisfies the predefined identity assurance level criteria.

12. The system of claim 9, wherein the predefined identity assurance level criteria is based on an identity assurance value assigned to the user authenticator associated with the loss incident.

13. The system of claim 9, wherein the user enrolls a selection of the plurality of available identity assurance techniques to be used for recovery after satisfying a specified enrollment authentication assurance level.

14. A computer program product, comprising a non-transitory tangible machine-readable storage medium having encoded therein executable code of one or more software programs, wherein the one or more software programs when executed by at least one processing device perform the following steps:

providing a plurality of available identity assurance techniques, wherein the plurality of available identity assurance techniques are assigned respective identity assurance values each indicating a level of assurance for the corresponding available identity assurance technique;

performing the following steps, in response to a user request to obtain access to a protected resource following a loss incident of a user authenticator:

receiving, from the user, authentication information associated with at least two selected identity assurance techniques of the plurality of available identity assurance techniques;

determining whether there is an overlap between the received authentication information associated with the at least two selected identity assurance techniques;

modifying the identity assurance value associated with at least one of the selected identity assurance techniques upon determining there is an overlap between the received authentication information;

aggregating the corresponding assigned identity assurance values for each of the at least two selected identity assurance techniques to determine an aggregate identity assurance value;

determining whether the aggregate identity assurance value satisfies a predefined identity assurance level criteria; and evaluating the user request to access the protected resource based on the determination of whether the aggregate identity assurance value satisfies a predefined identity assurance level criteria.

15. The computer program product of claim 14, wherein the receiving step further comprises the user selecting one or more available identity assurance techniques to perform one or more of user identity proofing and user authentication until the user satisfies the predefined identity assurance level criteria.

16. The computer program product of claim 14, wherein the receiving, aggregating and determining steps are performed iteratively until the user satisfies the predefined identity assurance level criteria.

17. The computer program product of claim 14, wherein the predefined identity assurance level criteria is based on an identity assurance value assigned to the user authenticator associated with the loss incident.

* * * * *